Aug. 17, 1954  R. L. SOUTHERN  2,686,825
FURNACE STRUCTURE
Filed Dec. 26, 1952
2 Sheets-Sheet 1

INVENTOR.
Raymond L. Southern.
BY
James K. Ely
ATTORNEY

Aug. 17, 1954

R. L. SOUTHERN 2,686,825

FURNACE STRUCTURE

Filed Dec. 26, 1952

INVENTOR.
Raymond L. Southern.

BY
James K. Ely
ATTORNEY

Patented Aug. 17, 1954

2,686,825

UNITED STATES PATENT OFFICE 2,686,825

FURNACE STRUCTURE

Raymond L. Southern, Henderson, Nev., assignor to Allegheny Ludlum Steel Corporation, Brackenridge, Pa., a corporation of Pennsylvania Application December 26, 1952, Serial No. 327,981

8 Claims. (Cl. 13—14)

This invention relates to furnaces and in particular to a furnace structure for use in conjunction with the melting of consumable electrodes.

Recent developments in the titanium base alloy field have made possible the production of commercially desirable alloys. However, the melting facilities for commercially producing such desirable alloys have proven to be entirely inadequate for the high production of alloys of commercial quality. A recent advance in such production practice has been to melt consumable electrodes of sponge titanium or scrap titanium metal to form the ingots. However, difficulties have been encountered through lack of facilities and equipment adequate to support the weight of the electrodes and to so control the feeding of the consumable electrode in to the melting crucible as to obtain a homogeneous ingot of a size commercially desirable.

An object of this invention is to provide a furnace structure for supporting and feeding a consumable electrode into a crucible as the electrode is melted to form an ingot.

Another object of this invention is to provide, in a furnace structure for the melting of a consumable electrode, a rack and gear mechanism for controlling movement of a consumable electrode while supporting the electrode in an operative relation for melting the electrode in a crucible.

A further object of this invention is to provide for supporting and controlling the movement of a consumable electrode while maintaining a good electrical connection thereto to facilitate the melting of the electrode in a crucible to produce a homogeneous ingot.

A more specific object of this invention is to provide a furnace having a rack and gear drive and guide mechanism for suppotring and controlling movement of a consumable electrode, the rack having a conducting member and an electrode holder secured thereto for simultaneous movement therewith and for maintaining a good electrical connection to the electrode as the electrode is moved.

Other objects of this invention will become apparent from the following description when taken in conjunction with the accompanying drawing in which.

Figures 1, 2:
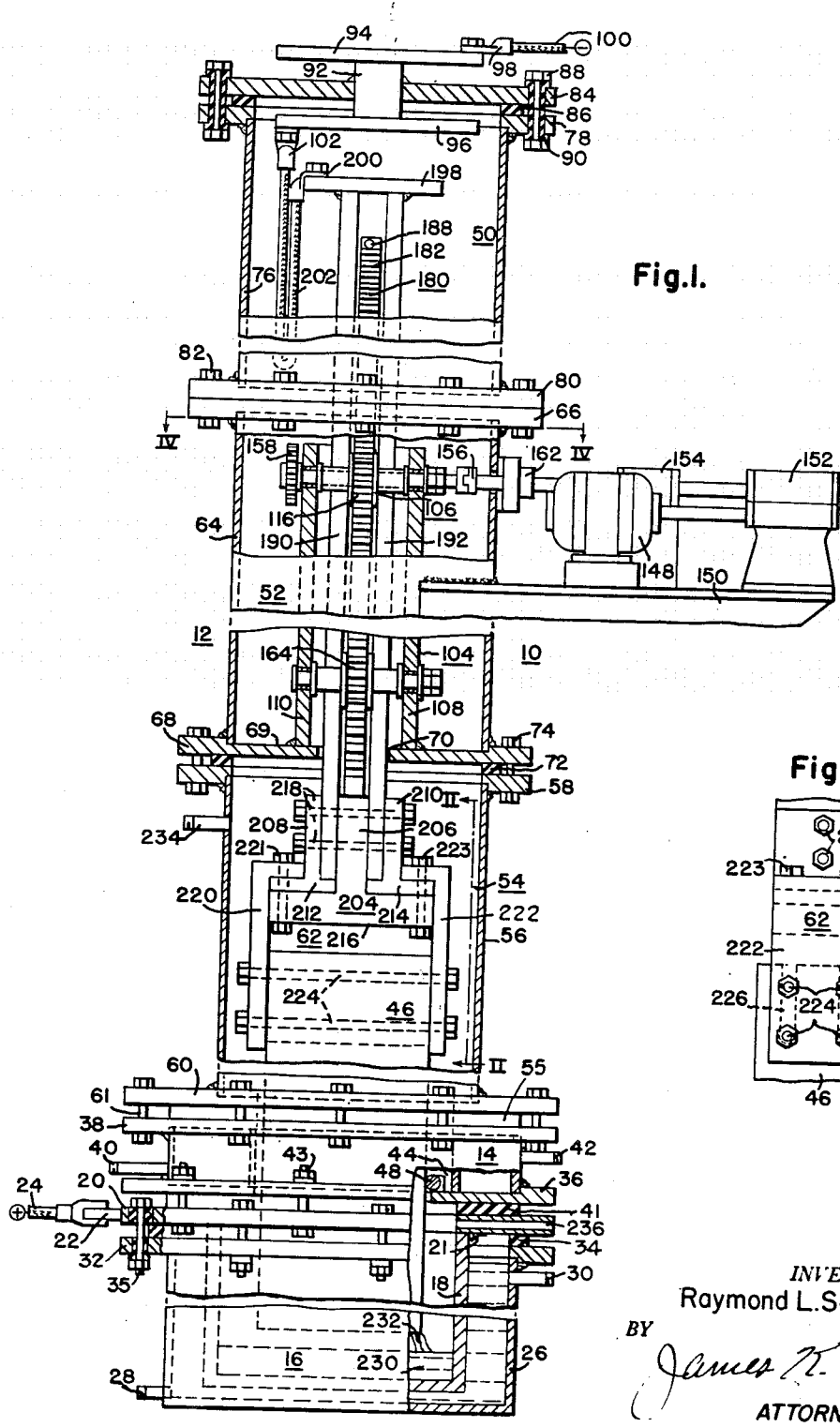
Figure 1 is an elevational view, partly in section and partly broken away, of a furnace structure embodying the teachings of this invention.
Figure 2 is a side elevational view of the electrode holder utilized in the structure of Figure 1 as taken along the line II—II thereof.

Referring to Figure 1 of the drawing there is illustrated a furnace structure generally designated as 10 which illustrates an embodiment of this invention. The furnace structure 10 comprises an upper portion 12, an intermediate portion 14 and a lower portion 16, all assembled in vertical aligned relation so as to provide a vertical furnace structure.

The lower portion 16 of the furnace structure 10 comprises a crucible 18 having an upper flange rim 20 extending outwardly therefrom, the flange 20 being welded as at 21 to the crucible 18 to provide a good electrical connection therebetween. The flange 20 is also provided with a terminal lug 22 whereby an electrical connection can be made with a conductor 24 which is connected to a suitable source (not shown) of direct current power. In order to effectively cool the crucible and the metal contained therein during the operation of the furnace, a water jacket 26 having an inlet 28 and an outlet 30 and an upper flange rim member 32 is disposed to be seated about the crucible 18. A gasket 34 of heat-resistant material is disposed between the rim members 20 and 32 of the crucible 18 and water jacket 26, respectively, for providing an insulated and leak-proof joint between the crucible 18 and the water jacket 26 when the rim members 20 and 32 are secured as by bolts 35. As will be apparent the crucible 18 can be readily removed from the water jacket 26 to remove an ingot of metal after such ingot is formed in the crucible 18 as will be described hereinafter, by removing bolts 35 and lifting the crucible 18 from the water jacket.

The intermediate portion 14 of the furnace structure is also a water jacket having a lower flange rim member 36 and an upper flange rim member 38, the water jacket being provided with inlet 40 and outlet 42 to facilitate the passage of cooling water thereto. Preferably a gasket 41 of heat-resistant and electrical insulating material is disposed between the rim member 36 and the rim 20 of the crucible 18 which are secured in assembled relation by bolts 43. In the embodiment illustrated the water jacket 14 is provided with a central opening 44 of a shape and size to accommodate the passage of a consumable electrode 46 therethrough to the crucible 18. Preferably the periphery of the opening 44 in the intermediate water jacket 14 is provided with rolls 48 formed of heat resisting material such as fibrous material impregnated with a synthetic resin. The rolls 48 on opposite sides of the opening 44 are mounted to project slightly within the opening 44, being spaced apart so as to receive and guide the electrode 46 in its passage through the opening 44 to the crucible 18.

The upper portion 12 of the furnace structure 10 is formed of an upper section 50, an intermediate section 52 and a lower section 54 which when assembled in aligned operative relation into an integral unit as will be described is disposed to seat on an insulating gasket 55 on the upper rim member 38 of the intermediate portion 14. The lower section 54 is provided with a side wall member 56 having an upper rim member 58 and a lower rim member 60 securely welded thereto, the lower rim member 60 being disposed to be secured to the rim member 38 of the intermediate portion 14 by means of bolts 61. This section is of a size suitable for accommodating a portion of the electrode 46 when held by an electrode holder 62 which will be described hereinafter.

The intermediate section 52 likewise is formed of a wall portion 64 having an upper rim member 66 and a lower rim member 68 suitably welded thereto. In this instance the lower rim member 68 extends inwardly across the lower end of the wall portion 64 to form a supporting base 69 provided with an opening 70 of a size to accommodate a portion of the operating mechanism for controlling the movement of the electrode 46 as will be described hereinafter. An insulating and leak-proof gasket member 72 is preferably disposed between the lower rim 68 of the intermediate section 62 and the upper rim 58 of the lower section 54 so that when the sections 52 and 54 are secured together as by means of the bolts 74, a leak-proof joint will be formed therebetween.

The upper section 50 is also provided with a wall member 76 having an upper rim member 78 and a lower rim member 80 secured thereto as by welding, the lower rim member being disposed to seat on the upper rim 66 of the intermediate section 52. Although not shown, a recessed gasket is preferably disposed between rim members 80 and 66 so that when the rims 80 and 66 are secured together as by bolts 82, a leak-proof joint will be formed therebetween.

In this embodiment, a cover 84 is disposed to seat on the upper rim 78 of the upper section 50, a gasket 86 being disposed therebetween for providing an insulated and leak-proof joint therebetween. The cover 84 is secured to the rim 78 as by means of bolts 88, flanged bushings or sleeves 90 of an insulating fibrous material being disposed about the bolts 88 to electrically insulate them from the rim 78 and the cover 84. The cover 84 is also provided with a centrally positioned plug 92 of conducting metal which is secured on opposite sides of the cover plate 84 to conducting wafers or plates 94 and 96, the plate 94 carrying a terminal 98 disposed to be connected to a conductor 100 which is connected to a suitable source (not shown) of direct current supply. In this manner an electrical connection may be made from the terminal 98 external of the housing 12 to a terminal 102 carried by the plate 96 internally of the housing 12.

As illustrated the supporting base 69 of the intermediate section 52 supports a vertical rectangular frame 104 which is disposed to carry a gear drive 106. As illustrated in the drawing the vertical frame 104 is formed of two side walls 108 and 110 connected by spacer end walls 112 and 114, all of the components thereof being suitably secured together and preferably welded in position to the base 69.

The gear drive 106 is formed of two driving gears 116 and 118 carried in operative relation by the side walls 108 and 110 in the vertical frame 104. As more clearly shown in Figs. 3 and 4 a pair of shafts 120 and 122 are disposed to extend through the side walls 108 and 110 being mounted therein in bearings 124—126 and 128—130, respectively. The bearings 124 and 126 are disposed in fixed relation whereas the bearings 128 and 130 are preferably rectangular sliding bearings. As more clearly illustrated in Fig. 3 the bearings 128 and 130 are disposed to be slideably maintained and positioned in response to the actuation of a threaded screw member 132 or 134, respectively, disposed to adjust the bias of springs 136 and 138, respectively, against pins 140 and 142, respectively, to adjust the slide bearings 128 and 130, respectively, to thereby adjust the force holding the shaft 122 positioned, the adjusting mechanism being mounted in suitable recesses formed in the ends of the side walls 108 and 110, respectively.

The gears 116 and 118 are suitably carried by the shafts 120 and 122, respectively, being centrally disposed between the side walls 108 and 110 of the vertical housing 104 and being so maintained as by means of spacer members 144 disposed between guides 146 and the bearings carried by the side walls 108 and 110. The purpose of the guides 146 will be explained more fully hereinafter.

In order to effectively control the operation of the drive gears 116 and 118, motor 148 is disposed external of the intermediate section 52 on a platform 150 which is suitably supported by the intermediate section 52 as by welding the platform thereto. The motor 148 is disposed to drive the gears 116 and 118 being connected thereto by a gear reducer 152, a coupler 154 and a clutch or coupler 156 internally of the section 52. The gears 116 and 118 are connected by means of connecting gears 158 and 160 carried on the ends of the shafts 120 and 122, respectively, external of the vertical frame 104. In practice a gland or seal 162 is provided so that the drive can be connected through the side wall of the intermediate section 52 in a leak-proof manner. Thus the drive gears 116 and 118 can be simultaneously actuated.

Figure 3:
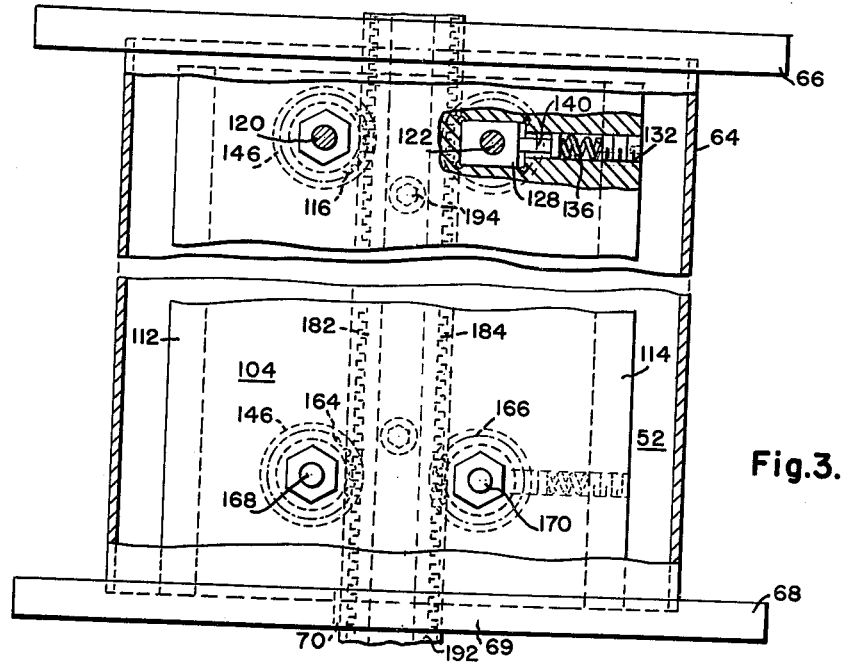
Figure 3 is an elevational view, greatly enlarged and partly in section and partly broken away, of an intermediate section of the upper portion of the furnace structure of Figure 1, illustrating certain features of the furnace structure.

In addition to the pair of drive gears 116 and 118, the vertical housing 104 also carries a pair of idler gears 164 and 166 which function as guide gears as will be understood more fully hereinafter. The idler gears 164 and 166, more clearly shown in Fig. 3, are mounted on shafts 168 and 170, respectively, which are also mounted in aligned bearings in the side wall members 108 and 110 of the vertical frame 104 similar to the bearings 124—126 and 128—130 of shafts 120 and 122, respectively. Both guide gears 164 and 166 are centrally disposed of their shafts 168 and 170, respectively, in a manner similar to that of the drive gears 116 and 118, the idler or guide gear 166 also being disposed for adjusting the force applied thereto in a manner similar to the drive gear 118. For simplicity of the drawing and clarification thereof, reference numerals are not applied to the components of such guide gears 164 and 166 and the adjustable holding mechanism for the guide gear 166 as it will be understood that substantially the same components will be provided for such guide gears as are provided for the drive gears 116 and 118.

In order to support the electrode 46 and to control the movement thereof, a rack mechanism 180 is disposed to be actuated by the drive gears 116 and 118 for movement between the drive gears and between the guide gears 164 and 166. In this instance the rack mechanism 180 is formed of a plurality of components such as two rack members 182 and 184, disposed on opposite sides of a longitudinally extending structural member 186 of stainless steel, or the like, having a substantially rectangular cross section. The rack members 182 and 184 are secured to the intermediate member 186 as by means of suitable bolts 188 extending therethrough, the heads of such bolts being counter-sunk in the rack members 182 and 184 so as not to interfere with the engagement of the drive and guide gears with such rack structure. The intermediate member 186 carrying the rack sections 186 and 188 is of a width to extend to the outer edge of the guide members 146 disposed on each side of each of the drive gears and the guide gears.

Figure 4:
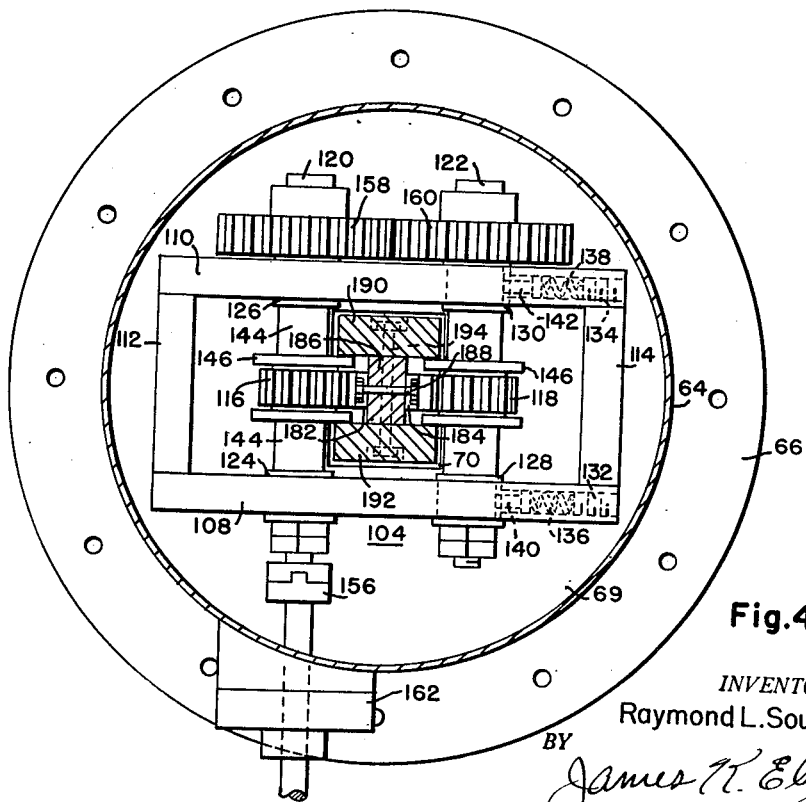
Figure 4 is a plan view, greatly enlarged, of the drive mechanism of the structure of Figure 1 taken along the line IV—IV thereof.

As more clearly illustrated in Figs. 1 and 4, straps or strips 190 and 192 of electrically conducting material are disposed across the opposite ends of the intermediate member 186 being secured in assembled relation therewith as by means of bolts 194 extending through the three members, the heads of the bolts 194 being counter-sunk in the conducting strips 190 and 192. The guides 146 associated with each of the drive gears and guide gears cooperate with the electrically conducting strips 190 and 192 to aid in maintaining the rack mechanism 180 in operative relation with respect to the drive gears 116 and 118 and the guide gears 164 and 166, it being understood that the drive gear 118 and the guide gear 166 are adjustable relative to their cooperating gears whereby the two drive gears and the two guide gears are in meshing engagement with the rack members 182 and 184 carried by the rack mechanism 180.

The rack mechanism 180 is preferably of a length to extend from a point adjacent the upper end of upper section 50 through the intermediate section 52 and into the lower section 54 of the upper portion 12 of the furnace structure. In order to provide for a good electrical connection with the rack mechanism 180, a plate member 198 of conducting metal is disposed across the upper end of the rack mechanism 180 being securely welded to the conducting strip members 190 and 192 and being provided with a terminal 200 thereon, the terminal 200 being disposed to be connected as by means of a flexible conductor or cable 202 to the terminal 102. The flexible cable 202 is of a sufficient length to provide an electrical connection between the terminals 200 and 102 as the rack mechanism 180 is lowered to a position where the upper end of the rack members 182 and 184 is closely adjacent the drive gears 116 and 118.

In order to carry the electrode 46, the rack mechanism 180 has its electrically conducting strip members 190 and 192 disposed to extend a distance below the lower end of the intermediate member 186 which carries the rack members 182 and 184. The lower ends of the strip members 190 and 192 are thus positioned to support the electrode holder 62.

The electrode holder 62 in this instance comprises a plurality of structural elements assembled in cooperative relation. Thus an inverted T-shaped structural member 204, the tongue 206 of which has a thickness substantially equal to the width of the space between the lower ends of the conducting strips 190 and 192, is disposed with the tongue 206 between such lower ends of strips 190 and 192. In order to provide for securing the electrode holder 62 to the rack mechanism 180 and to provide for carrying the weight of the electrode 46, a pair of side plate members 208 and 210 are disposed in an abutting relation with the sides of the conducting strips 190 and 192 at their lower ends, the side plate members being provided with outwardly extending flange base plates 212 and 214, respectively, which are disposed between the ends of associated strip members 190 and 192 and the plate portion 216 of the T-shaped member 204. The side plate members 208 and 210 and the T-shaped member 204 are all preferably of electrically conducting material such as stainless steel or copper base alloy and when assembled as described are secured together by a plurality of bolts 218 which extend through all of the assembled members. The plate portion 216 of the T-shaped member 204 is preefrably of a width substantially equal to the width of the electrode 46 which is to be supported by the rack mechanism 180. As illustrated, a pair of inverted substantially L-shaped members 220 and 222 of conducting material are disposed with the base portions thereof in seating engagement on the plate flanges 212 and 214, respectively, of the side conducting members 208 and 210, respectively, with the leg portion of such L-shaped members extending downwardly a distance for receiving an end of the electrode 46 therebetween and to overlap the end of the electrode 46. The L-shaped members 220 and 222 are secured in assembled relation on the flange plates 212 and 214, respectively, by means of bolts 221 and 223, respectively, which extend through the base portions of the L-shaped members 220 and 222, respectively, the flange plates 212 and 214, respectively, and the lower flange plate 216 of the substantially T-shaped member 204, whereby all of these components are secured together in a strong mechanical joint with a good electrical connection therebetween. Such leg portions are also provided with a plurality of bolts 224 disposed to extend therebetween and to bias the leg portions inwardly toward each other into holding engagement with the sides of the electrode 46. In practice the end of the electrode 46 is slotted as at 226 and 228 as shown in Fig. 2 for receiving the bolts 224 when the leg portions of the members 220 and 222 overlap the electrode.

In operation the upper portion 12 is disconnected from the intermediate portion 14 and the lower portion 16 of the furnace when the rack mechanism 180 is in its upper position as illustrated in Fig. 1, and an electrode 46 is guided into position between the extending leg portions of the L-shaped members 220 and 222. After the electrode 46 is positioned in the electrode holder 62 and is secured thereto as by means of the bolts 224, the intermediate portion 14 is secured thereto and the assembly is then mounted in position on the lower portion 16 and secured thereto by the bolts between the rim members 36 and 20.

When the conductors 100 and 24 are connected to a direct current source of power (not shown) the motor 148 is operated through a separate circuit, not shown, to drive the gears 116 and 118 to effect a downward motion of the electrode 46 to a position where an arc 232 is struck between the electrode 46 and an initial supply 230 of titanium metal contained within the crucible 18.

Prior to striking the arc 232, the crucible 18 and the space within the upper portion 12 and the intermediate portion 14 of the furnace structure is preferably flushed with an atmosphere such as argon or helium which is non-contaminating to titanium. The flow of gas is preferably continued throughout the melting operation and can be supplied from a suitable source (not shown) to the furnace structure in any suitable manner such as through an inlet 234, which although illustrated as being in the lower section 54 of the upper portion 12 can be positioned or located wherever desired for effecting a satisfactory flushing of the apparatus and the maintenance of a continuous supply of the non-contaminating gas to the melt of titanium metal as the electrode 46 is melted. Likewise, a suitable exit 236 is provided in the rim 20 preferably in direct communication with the space within the crucible 18.

The feeding of the electrode 46 into the crucible 18 is maintained at a suitable rate to provide a predetermined arcing relation between the electrode 46 and the melt within the crucible 18. Suitable controls for controlling the operation of the motor 148 in response to the arc voltage or arc current are known to the art and will not be described or otherwise referred to herein except to indicate that it is desired to maintain the rate of feed of the electrode 46 at a substantially constant rate to maintain a given arc within the crucible 18. As will be quite apparent, the support of the electrode 46 is entirely through the electrode holder 62 and the rack mechanism 130 as supported by the drive gears 116 and 118, the guide gears 164 and 166 and the rolls 48 only functioning to maintain the electrode in a central position with respect to the inner walls of the crucible 18 to prevent arcing between the electrode 46 and the side walls of the crucible 18.

This invention provides a simple but rugged support and drive that can be formed of standard components and can be readily reproduced by anyone skilled in the art for controlling the melting of consumable electrodes. Efficient melting of the electrode is accomplished since all of the electrode with the exception of only a small portion of the electrode slightly longer than the thickness of the insulating water-cooled intermediate portion 14, can be melted leaving only a very small butt end of the electrode as scrap material which cannot be melted in the furnace structure of this invention. As will be apparent, this structure can be employed for different sized electrodes 46, the only requirement for the different sized electrodes being that the insulated water-cooled jacket 14 be selected so that the distance between the rolls 48 is approximately equal to the thickness of the electrode and that the electrode holder 62 be adjusted in accordance to the size of the electrode. It is thus seen that with a series of different sized intermediate portions 14 and different sized electrode holders 62 that a large number of different sized electrodes ranging up to 18-inch square and weighing hundreds of pounds can be readily melted with the apparatus of this invention.

I claim:
1. In a furnace structure for facilitating movement of a consumable electrode into a crucible as the electrode is melted to produce an ingot in the crucible, the combination comprising, a housing disposed to be seated in aligned relation with the crucible, a strap of electrical conducting metal disposed to extend longitudinally within the housing, means for electrically connecting one end of the strap to a terminal external of the housing, a rack and gear drive therefor disposed within the housing, the rack and strap being connected together but insulated one from the other whereby operation of the gear drive effects a simultaneous longitudinal movement of the rack and strap within the housing, an electrode holder carried at the other end of the strap disposed for movement in response to movement of the strap, the electrode holder being disposed to receive an end of the consumable electrode, and means for securing the end of the electrode in the holder to support the electrode for longitudinal movement into the crucible and provide a good electrical connection between the electrode holder and the electrode.

2. In a furnace structure for facilitating movement of a consumable electrode into a crucible as the electrode is melted to produce an ingot in the crucible, the combination comprising, a housing disposed to be seated in aligned relation with the crucible, a pair of straps of conducting metal disposed in spaced relation to extend longitudinally within the housing, means for electrically connecting the pair of straps to a terminal external of the housing, a rack and gear drive therefor disposed within the housing, the rack being disposed between the pair of spaced apart straps and secured thereto whereby operation of the gear drive effects a simultaneous longitudinal movement of the rack and straps within the housing, an electrode holder carried by the straps and disposed for movement therewith, the electrode holder being disposed to receive an end of the consumable electrode, and means for securing the end of the electrode in the holder to support the electrode for longitudinal movement into the crucible and provide a good electrical connection between the electrode holder and the electrode.

3. In a furnace structure for facilitating movement of a consumable electrode into a crucible as the electrode is melted to produce an ingot in the crucible, the combination comprising, a housing disposed to be seated in aligned relation with the crucible, a rack and gear drive disposed within the housing, supporting means disposed within and carried by the housing for carrying the gear drive, the gear drive comprising a pair of oppositely disposed gears connected to be simultaneously driven, the rack being disposed between said pair of gears for longitudinal movement within the housing in accordance with the operation of said pair of gears, a pair of strap members of electrical conducting metal disposed on opposite sides of the rack and carried thereby for movement therewith, means for electrically connecting the pair of strap members to a terminal external of the housing, an electrode holder carried by the strap members in electrical contact therewith and disposed for movement with the strap members, the electrode holder being disposed to receive an end of the consumable electrode, and means for securing the end of the electrode in the holder to support the electrode for longitudinal movement into the crucible and provide a good electrical connection between the electrode holder and the electrode.

4. In a furnace structure for facilitating movement of a consumable electrode into a crucible as the electrode is melted to produce an ingot in the crucible, the combination comprising, a housing disposed to be seated in aligned relation with the crucible, a rack and gear drive disposed within the housing, supporting means disposed within and carried by the housing for carrying the gear drive for the rack, the gear drive comprising a pair of oppositely disposed gears connected to be simultaneously driven, the rack being disposed between said pair of gears for longitudinal movement within the housing in accordance with the operation of said pair of gears, one of the gears being carried by the supporting means in a fixed position relative to the rack, spring means disposed to bias the other of said pair of gears into engagement with the rack whereby the pair of gears cooperate to retain the rack supported therebetween and to control the longitudinal movement thereof, a pair of strap members of electrical conducting metal disposed on opposite sides of the rack and secured thereto for movement therewith, the pair of strap members extending beyond the ends of the rack, means for electrically connecting one end of the pair of strap members to a terminal external of the housing, an electrode holder carried by the other end of the pair of strap members in electrical contact therewith, the electrode holder being disposed to receive an end of the consumable electrode, and means for securing the end of the electrode in the holder to support the electrode for longitudinal movement into the crucible and to provide a good electrical connection between the electrode holder and the electrode.

5. In a furnace structure for facilitating movement of a consumable electrode into a crucible as the electrode is melted to produce an ingot in the crucible, the combination comprising, a housing disposed to be seated in aligned relation with the crucible, a rack and gear drive disposed within the housing, supporting means disposed within and carried by the housing for carrying the gear drive, the gear drive comprising a pair of oppositely disposed gears disposed in spaced relation to each other and connected to be simultaneously driven, a pair of idler gears disposed in spaced relation to each other and carried by the supporting means in spaced relation to the opposed gears of the gear drive, the rack being disposed in engaging relation with and between the opposed gears of each of the pairs of drive gears and idler gears for longitudinal movement within the housing in accordance with the operation of said pair of drive gears, the idler gears cooperating with the rack to guide the rack as it moves in response to the operation of the drive gears, a pair of strap members of electrical conducting metal disposed on opposite sides of the rack and carried thereby for movement therewith, means for electrically connecting the pair of strap members to a terminal external of the housing, an electrode holder carried by the strap members in electrical contact therewith and disposed for movement with the strap members, the electrode holder being disposed to receive an end of the consumable electrode, and means for securing the end of the electrode in the holder to support the electrode for longitudinal movement into the crucible and provide a good electrical connection between the electrode holder and the electrode.

6. In a furnace structure for facilitating movement of a consumable electrode into a crucible as the electrode is melted to produce an ingot in the crucible, the combination comprising, a sectional housing formed of three aligned sections disposed to be seated in aligned relation with the crucible, a rack and gear drive disposed within the housing, supporting means disposed within and carried by the intermediate section of the housing for carrying the gear drive, the gear drive comprising a pair of oppositely disposed gears in spaced relation to each other and connected to be simultaneously driven, the rack being disposed between said pair of gears in meshed engagement therewith for longitudinal movement within the housing in accordance with the operation of the drive gears, a pair of strap members of electrical conducting metal disposed on opposite sides of the rack and carried thereby for movement therewith, means for sealing the sections of the housing into a gas leakproof integral structure, means for electrically connecting the pair of strap members to a terminal external of the housing, said connecting means including a flexible conductor to permit longitudinal movement of strap members as the rack moves without interrupting the electrical connection of the strap members to the external housing, an electrode holder carried by the strap members in electrical contact therewith, the electrode holder being disposed to receive an end of the consumable electrode, and means for securing the end of the electrode in the holder to support the electrode for longitudinal movement into the crucible and provide a good electrical contact engagement between the electrode holder and the electrode.

7. In a furnace structure for facilitating movement of a consumable electrode into a crucible as the electrode is melted to produce an ingot in the crucible, the combination comprising, a housing disposed to be vertically seated in aligned relation with the crucible, a rack and gear drive therefor disposed within the housing, supporting means disposed within and carried by the housing for carrying the gear drive, the rack being disposed for longitudinal vertical movement within the housing in accordance with the operation of the gear drive, a pair of strap members of electrical conducting metal disposed in spaced relation on opposite sides of the rack and carried thereby for vertical movement therewith, the ends of the strap members extending beyond the ends of the rack, flexible means for electrically connecting the upper ends of the strap members to a terminal external of the housing, a substantially T-shaped member having a tongue disposed to extend into the space between the lower ends of the strap members and a plate portion disposed to extend across and beyond the lower ends of the spaced strap members, a side conducting member disposed in electrical contact engagement with the lower end of each of the strap members, each of the side conducting members having a lower flange plate disposed between the end of its associated strap member and the plate portion of the T-shaped member and extending outwardly over and in seating engagement on said plate portion, means for securing the side conducting members, the strap members and the tongue of the T-shaped member together in assembled relation, a substantially L-shaped member of electrical conducting material associated with each of the side conducting members and disposed with the base portion thereof in seating engagement on the lower flange plate thereof and the leg portion thereof extending downwardly below the plate portion of the T-shaped member, the downwardly extending leg portions of the L-shaped members being in spaced relation to each other and disposed to cooperate to receive an end of the consumable electrode, and means for securing the end of the electrode between the downwardly extending leg portions of the L-shaped members in good electrical contact engagement therewith for supporting the electrode for longitudinal movement in accordance with the operation of the gear drive.

8. In a furnace structure for facilitating movement of a consumable electrode into a crucible as the electrode is melted to produce an ingot in the crucible, the combination comprising, a housing disposed to be vertically seated in aligned relation with the crucible, a rack and gear drive therefor disposed within the housing, supporting means disposed within and carried by the housing for carrying the gear drive, the rack being disposed for longitudinal vertical movement within the housing in accordance with the operation of the gear drive, a pair of strap members of electrical conducting metal disposed in spaced relation on opposite sides of the rack and carried thereby for vertical movement therewith the ends of the strap members extending beyond the ends of the rack, flexible means for electrically connecting the upper ends of the strap members to a terminal external of the housing, a substantially T-shaped member having a tongue of a thickness substantially equal to the width of the space between the lower ends of the strap members and a plate portion of a width sufficient to extend across and beyond the lower ends of the spaced strap members, the T-shaped member being disposed with the tongue thereof extending into the space between the lower ends of the strap members, a side conducting member disposed in electrical contact engagement with the lower end of each of the strap members, each of the side conducting members having a lower flange plate disposed between the end of its associated strap member and the plate portion of the T-shaped member and extending outwardly over and in seating engagement on said plate portion, means for securing the side conducting members, the strap members and the tongue of the T-shaped member together in assembled relation, a substantially L-shaped member of electrical conducting material associated with each of the side conducting members and disposed with the base portion thereof in seating engagement on the lower flange plate thereof and the leg portion thereof extending downwardly below the plate portion of the T-shaped member, the downwardly extending leg portions of the L-shaped members being in spaced relation to each other and disposed to cooperate to receive an end of the consumable electrode, and means for securing the end of the electrode between the downwardly extending leg portions of the L-shaped members in good electrical contact engagement therewith for supporting the electrode for longitudinal movement in accordance with the operation of the gear drive.

References Cited in the file of this patent
UNITED STATES PATENTS

| Number | Name | Date |
|---|---|---|
| 883,110 | Hartenstein | Mar. 24, 1908 |
| 2,640,860 | Herres | June 2, 1953 |